Patented May 4, 1954

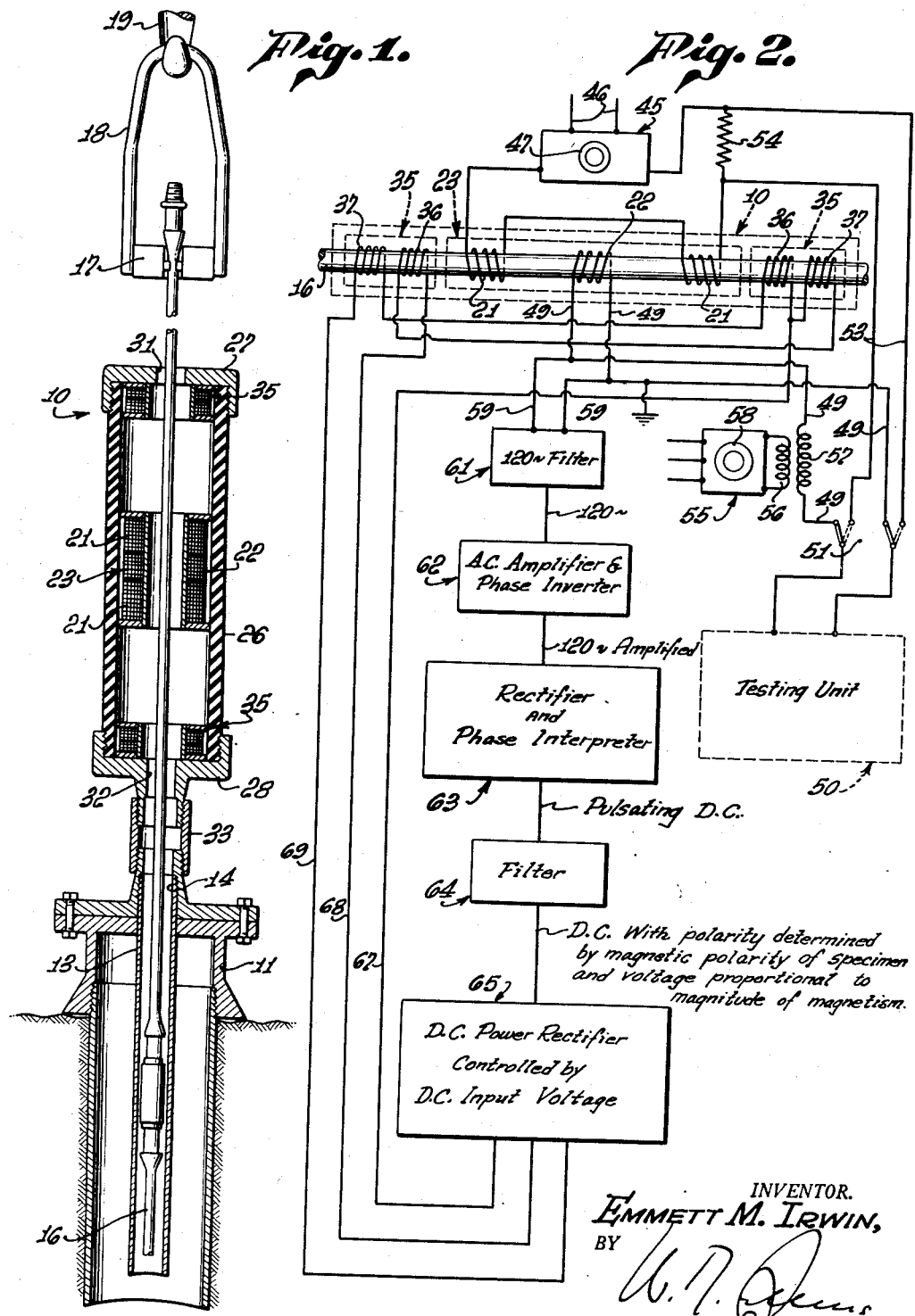

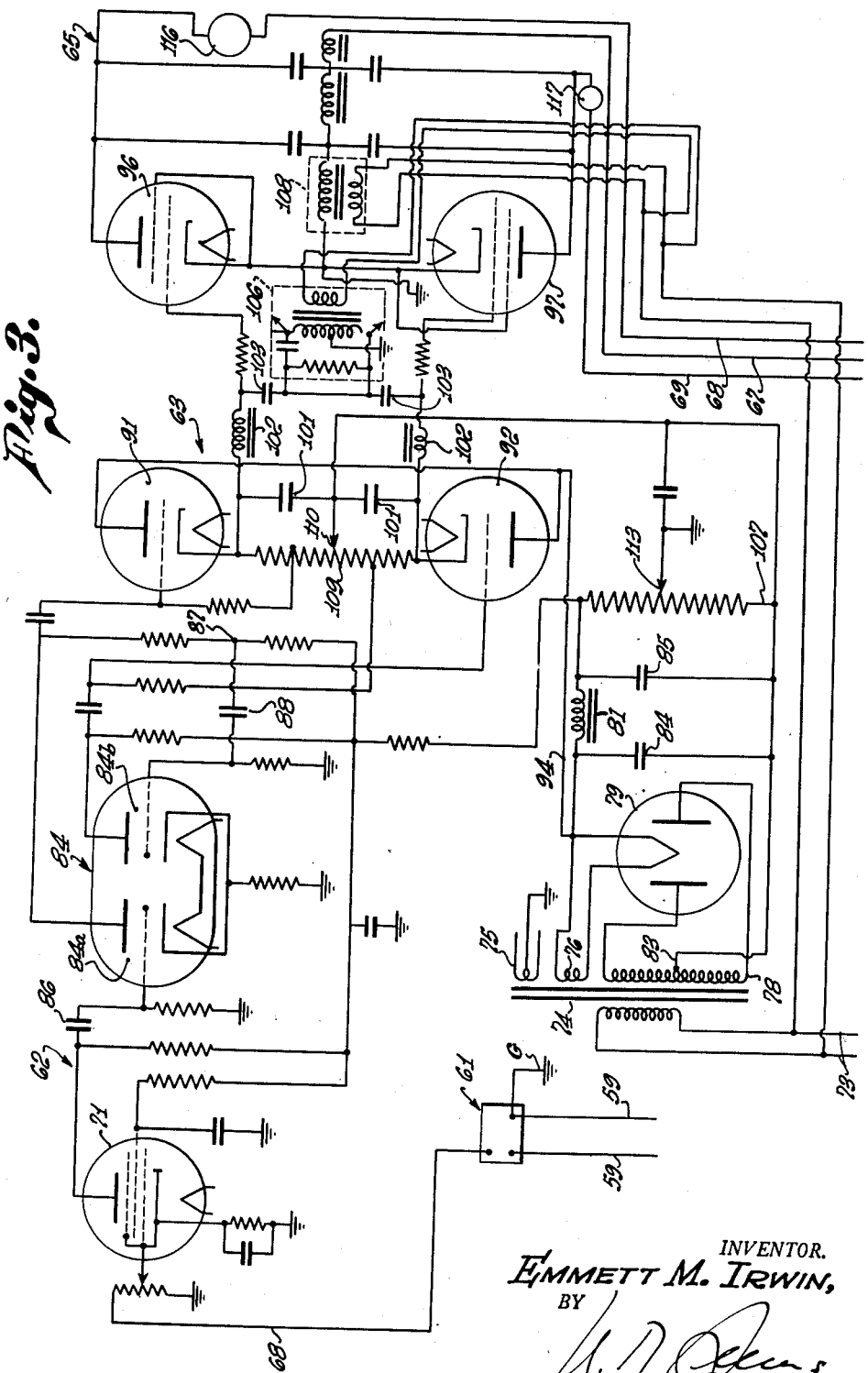

2,677,802

UNITED STATES PATENT OFFICE 2,677,802

METHOD AND APPARATUS FOR DEMAGNETIZING MATERIAL

Emmett M. Irwin, San Marino, Calif.

Application November 25, 1949, Serial No. 129,472

16 Claims. (Cl. 324—34)

The present invention relates to a method and apparatus for electrically testing the properties of materials and particularly to improvements in such methods and apparatus which effect the demagnetization of the material undergoing test in order that the test results will be unaffected thereby. More specifically the invention comprises a method and an apparatus for effecting neutralization of the magnetization of the material undergoing test and capable of immediate compensation in the presence of reversed polarity in the material.

It is today possible to test materials electrically for the purpose of determining characteristics or conditions present. In one preferred method the material undergoing test is excited electrically, as by an alternating magnetic field, the effect of the material upon the field being observed or recorded, either visually or by means of a permanent record, to give the necessary indication of the property of the material which is of interest. A material may be tested in this manner for the purpose of determining the presence of stress and/or strain indicative of fatigue and failure. It is also possible to use the general method in the determination of hardness as well as chemical make-up.

One preferred form of electrical testing equipment capable of predetermining fatigue failure in materials, and particularly useful in determining the stress and strain in elongated metal members, such as sucker rods in oil wells, is disclosed and claimed in applicant's co-pending application Serial No. 121,672, filed October 17, 1949. For purposes of disclosure the present invention is shown related to the test equipment specifically disclosed and claimed in that co-pending application. Another system is disclosed in the Kinsley Patent 1,743,087. In applicant's co-pending application construction use is made of the first harmonic of the voltage picked up from the material being tested. In Kinsley's patent the use of the first harmonic or other odd harmonics is taught.

In the testing method of the application referred to, used, for example in the testing of sucker rods to determine defects and actual or potential failures therein, each unit of length of the rod has induced therein an alternating magnetic field set up by an alternating current in one or more primary coils, and an induced current is generated by the induced field in the specimen in a secondary coil. Changes in the secondary current indicate the characteristic or property of the portion of the rod being tested. The exact method of testing, and the apparatus for carrying out that method, are not of the essence here, it being sufficient to state that the testing unit disclosed is to be considered as typical of an electrical testing unit affected adversely by the magnetism of the material being tested. The effect of the magnetism is particularly noticeable where elongated metallic elements, such as pipes or sucker rods, are being tested and which have extended into the earth for great distances being subjected while so positioned to the earth's magnetic field. The permanent magnetism in the element or elements may have been induced by other sources, but whatever the cause its presence in the element or material being tested effects the indications received. Were the polarity and strength of the magnetism a constant its effect could be neutralized by determining its extent and supplying an equal and opposite neutralizing field at the portion of the element or material being tested. Unfortunately, however, the strength of the residual magnetic field may vary over an extended length of the rod or pipe and, additionally, may change in polarity between adjacent sections of the same rod or pipe. This reversal of polarity is particularly important, for even though there has been a compensation for the initial unidirectional magnetism a reversal of polarity will cause the residual magnetic field and the compensating field to become complementary, that is, they will strengthen each other. The result will be an erroneous unreliable reading and result in the test.

As previously indicated, the present invention is not limited to usefulness with the test apparatus of applicant's co-pending application. It is instead capable of effecting demagnetization of a material or element being tested by other electrical apparatuses as well.

The invention does find particular usefulness with the copending invention and for purposes of the present disclosure will be disclosed in combination therewith.

In one preferred form of that invention and in testing sucker rods as they are pulled from a well, each unit of length is tested as it leaves the well to determine the presence or absence of fatigue and failure. Rods which give indication of being fatigued are removed or are so positioned in the well when repositioned that the load to which they are subjected will be within their capabilities. As the rod is pulled from the well it passes through coils which induce an alternating magnetic field, and from the rod at a closely adjacent point the field induced by the primary coils is effective to induce a current in a secondary coil. The rod having been in the well for a period of time it may have been magnetized by the earth's magnetic field and that magnetism effects the current in the secondary coil whereby the indications which it gives are misleading. As the rod is made up of connected sections a reversal of polarities occurs at times at the adjacent ends and upon the testing unit approaching and passing such an end the indications given by the induced current in the test coil secondary are misleading. Accordingly the demagnetizer constructed in accordance with the present invention functions not only to neutralize the effect of magnetization continuously of one polarity but also magnetization of which reverses in polarity.

It has been found that even harmonics of the alternating current induced in the secondary winding of the test coil unit give a reliable indication of the magnetism present in the element or rod being tested. Accordingly the excitation of demagnetizing flux is controlled in accordance with the variations in the alternating flux to which the secondary coil of the test unit is subjected, and more specifically in response to the variations in the second harmonic of the current derived from the secondary test coil. This is accomplished by placing a second harmonic filter in the circuit of the secondary test coil. Assuming a 60-cycle primary current, the second harmonic will have a frequency of 120 cycles, and this current will be passed by the 120-cycle filter, is then amplified and compared with a known wave of 120 cycles in order to determine its phase which, incidentally, will be 180 degrees reversed upon the polarity of the magnetization of the element undergoing test being reversed. As the amplitude of the 120-cycle current is directly proportional to the intensity of unidirectional magnetization of that portion of the specimen being tested, a pulsating direct current will be delivered upon rectification which is pulsating and of known direction. This rectified direct current voltage may then be used to control the action of power tubes providing an output which is proportional to the input power resulting from the unidirectional magnetization in polarity and amplitude but is of greater power. If this voltage is then sent to demagnetizing coils located at the specimen or element being tested a magnetic field may be generated counter to the flux set up by the magnetism and which will effect neutralization at the point undergoing test. This neutralization is only local and may in fact comprise merely the by-passing at the protected demagnetized area of the flux set up by the permanent magnetism. Actually not all of the flux is by-passed, for if it were the method would cease to be responsive, but the leakage while insufficient to cause important error is sufficient to enable the unit to remain self-adjusting.

With an appreciation of the problems characteristic of the field to which the invention relates, and in order to provide a more perfect and accurate method and apparatus for the determination of the characteristics and properties of materials and elements electrically, it is an object of the present invention to provide a new and novel method and apparatus for the demagnetization of materials, whether the magnetization therein has been produced by adjacent electrical circuits or by the earth's magnetic field, which demagnetization is effective to maintain the material or element, or that portion thereof undergoing test, in a demagnetized condition during the test and in order to prevent the magnetism from adversely affecting the ability of the test apparatus accurately to determine the condition or the property of the material being tested.

Another object of the invention is to provide a novel method and apparatus for effectively demagnetizing material being tested, the material or the portion thereof undergoing test being maintained in a uniform condition of demagnetization during the test to prevent residual magnetism from interfering with the accurate determination of the conditions or properties of the material being tested.

A still further object of the invention is to provide a novel method and apparatus for effectively magnetically neutralizing that portion of the length of a rod or pipe being pulled from an oil well and magnetically affected by the earth's magnetic field.

Still another object of the invention is to provide a novel method and apparatus for effecting the demagnetization of an element being tested electrically and in which countermagnetization is controlled in accordance with a harmonic of alternating flux induced by the testing apparatus.

Still another object of the invention is to provide a method and apparatus for demagnetizing a material retaining magnetism in which the material is excited with an alternating flux and an even harmonic of the resulting alternating flux produced by the alternating flux as affected by the magnetic field of the material is utilized to indicate the presence of magnetism in the material.

Another object of the invention is to provide a novel method and apparatus for demagnetizing a material retaining magnetism in which the material is excited with an alternating field in demagnetizing the material, and in which an even harmonic of the alternating flux produced is utilized to indicate the extent of magnetism in the material.

Another object of the invention is to provide a novel method and apparatus for electrically testing a material having magnetization in which the material is electrically excited to induce therein an alternating flux to demagnetize it, in which all frequencies except even harmonics are filtered from energy derived from the impressed alternating flux, and in which the filtered even harmonic energy is utilized to control the demagnetizing excitation.

A still further object of the invention is to provide a novel method and apparatus for electrically testing a material having magnetization the polarity of which is variable in which the material is electrically excited to induce therein an alternating flux, in which all frequencies except the even harmonics are filtered from energy received from the alternating flux, and in which the filtered even harmonic energy is rectified and utilized to produce a damagnetizing excitation.

A further object of the invention is to provide a novel method and apparatus for electrically testing a magnetized material in which the material is electrically excited to induce therein an alternating flux, in which energy of small magnitude derived from a circuit producing an indication of a condition or a property of the material is selectively filtered, amplified, and rectified.

A still further object of the invention is to provide a novel method and apparatus for demagnetizing a rod or the like undergoing test as it is withdrawn from a well in which it has been magnetically affected by the earth's magnetic field, and in which an electrical characteristic is indicative of a property or condition of the rod being tested.

These and other more specific objects will appear upon reading the following specification and claims and upon considering in connection therewith the attached drawings to which they relate.

Referring now to the drawings in which a preferred embodiment of the invention is illustrated:

Figure 1 is a schematic diagram illustrating the relationship of the testing head incorporating the testing and demagnetizing units with respect to an oil pump rod being withdrawn from a well;

Figure 2 is a diagrammatic showing of the testing and demagnetizing units related to an element undergoing test; and Figure 3 is a diagrammatic view of the electrical circuit by which the small energy even harmonic current impulse is received and used to control the output of a power rectifier connected to the demagnetizing coils as illustrated in Figure 2.

Referring now to Figure 1 in particular, there is shown diagrammatically an oil well pump rod or sucker rod being withdrawn from a well and passing through the testing head, generally indicated by the reference character 10. The oil well casing head 11 seats threadedly upon the upper end of the oil well casing 12 and an oil pipe or tube 13 extends downwardly through the head and casing, being threaded to the casing head at its upper end at 14. At the unshown lower end of the oil pipe 13 a pumping unit including a barrel and piston will be positioned, the piston being connected to the lower end of rod 16 which, in accordance with conventional practice, is formed of a series of rod sections connected at their adjacent ends. In the operation of the well the rods 16 are reciprocated vertically by suitable unshown mechanisms, such as a walking beam, and in order to actuate the pump piston to pump oil up through the pipe 13 to the top of the well. The length of the rod at times runs to many thousands of feet and the reciprocation of this great length results in severe stresses which are reversed with each reversal in the direction of travel. These stresses frequently set up strains and result in fatigue and failure which, when it occurs at great depths within the well, causes great difficulty and gives rise to great expense both in the loss of pumping time and in removing and replacing the broken rod. It is, accordingly, extremely desirable that failure be anticipated and the testing head 10 previously referred to is a part of the testing apparatus for determining the condition and characteristics of the rod, preferably as it is removed from or inserted in the well as by an elevator 17 to which it is secured at its upper end and which includes a bail 18 connected as by a sheave 19 to a cable which extended to the upper end of the oil derrick. In the withdrawal of the rod from the well usually several lengths are pulled up at a time and lifted from the well and secured in the derrick, each unit of length of the rod passing through the test head 10 as is illustrated.

In the testing of the rod as it is pulled from the well each unit of length passes through the test head 10 and is there excited by an alternating current in the primary windings 21 which current is effective to induce an alternating flux field within the rod which in turn induces a flow of alternating current in the secondary coil 22. The control and operation of primary and secondary coils is a part of applicant's invention as disclosed and claimed in co-pending application Serial No. 121,672 previously referred to. For purposes of the present invention it is important merely that an induced magnetic field is set up by the primary coils 21 for the purpose of inducing a secondary current in the secondary coil 22 and that the current induced in the secondary winding 22 shall be indicative of the characteristics or properties existing within the length of rod at the portion being tested. The primary coils 21 and the secondary coil 22 may be referred to generally as the test coil unit 23.

The exact physical construction of the testing head 10 is not of the essence but in the illustrated form it comprises an outer heavy insulating sleeve 26 within which the testing coil unit 23 is positioned and which is closed at its ends by an upper cap 27 and by a lower cap 28 through which the rod 16 may pass at openings 31 and 32, respectively. Lower cap 28 includes a reduced neck which threads interiorly into a coupling member 33 threaded to the upper end of the casing head 11. Also within the testing head 10 are the demagnetizing units, indicated generally by the reference character 35, each of which comprises a pair of oppositely wound coils and which are positioned upon opposite sides of the test coil unit 23 in the manner illustrated.

In the operation of the rods 16 within the well the earth's magnetic field induces magnetism therein which subsequently interferes with the accuracy of the indications obtained from the current induced in the secondary winding 22 by the flux generated in the rod by the primary windings 21. According to the present invention any residual magnetism of the rods is counterbalanced or opposed by a counter-field set up by the demagnetizing units 35. The strength of the demagnetizing field must be opposite to and substantially equal to the magnetic field otherwise present and its polarity must be reversible in order to compensate for changes in polarity of the magnetic field itself which sometimes occur when successive sections of the rods 16 pass through the head 10. It is primarily in the method and in the apparatus of and for controlling the strength and polarity of the demagnetizing field that the present invention resides. Actually the exact number of demagnetizing coil units and their location are not controlling, for the indication of the need for the demagnetizing field comes from an even harmonic of the current flowing in the secondary coil 22 of the testing coil unit 23. If the demagnetizing coil or coils are provided with a sufficient number of turns and current to counterbalance and render impotent the effect of the residual magnetic field, as evidenced by the even harmonic referred to, then the desired result has been obtained and whether the counterbalancing field be set up by one or more than one demagnetizing coil unit is not important. Any number of coils in any arrangement which will effect the neutralization of the magnetic field resulting from the residual magnetism in the element or rod undergoing test will be satisfactory.

Referring now more particularly to Figure 2 of the drawings, there is shown diagrammatically the apparatus for effecting the demagnetization of a rod 16 undergoing test. The particular testing apparatus, which is to be viewed as exemplary, is of the type disclosed and claimed in applicant's co-pending application Serial No. 121,672, and is also shown diagrammatically. The testing unit head 10, previously described, is seen to include the testing coil unit 23, incorporating the primary coils 21 and the secondary coil 22, and also the demagnetizing coil units 35 comprising in each instance a pair of coils 36 and 37. The exciting unit, indicated generally by the reference character 45, is connected to a suitable source of alternating current and directly to the coils 21 of the testing coil unit. An operator-controlled knob 47 enables the operator to vary the exciting current passing to primary windings 21 and thus to control the strength of the alternating magnetic field set up in the specimen undergoing test. The secondary coil 22 of the testing coil unit 23 is seen to be connected through leads 49 to a double throw switch 51 which in turn connects directly to the testing unit, generally indicated at 50, and which, as is clearly disclosed in the co-pending application, may include an amplifier or amplifiers for current and a dynamometer or dynamometers, together with a suitable recording device, current phase-shifting units, etc., as are necessary to the making of the determination of the characteristic or property of interest of the material or element being tested from the secondary current supplied. The double throw switch 51 is also connected by leads 53 to opposite sides of a resistance 54 connected between one of the primary windings 21 and the exciting unit 45 and provides means by which the testing unit may be initially balanced. Additionally, a phase-shifting unit, indicated generally by the reference character 55, has a winding 56 positioned in inductive relationship to a winding 57 in one of the leads 49 and provides means by which the operator, by the adjustment of the knob 58 of the unit, may control the phase and the flow of current in the secondary winding 22 for purposes of obtaining a null balance at the beginning of a test.

The exact operation of the testing unit 50, of the phase-shifting unit 55 used in obtaining a null balance, and the use of the voltage drop across resistance element 54 for purposes of properly orienting the current in the dynamometer or dynamometers, do not comprise a part of the present invention. Rather, the method of testing the specimen by that apparatus and the apparatus itself is to be considered merely typical of an apparatus in which use is made of an induced electrical magnetic field in a test specimen to determine the characteristics of an element undergoing test, and in which it is necessary or desirable to eliminate the effect of residual magnetism in the specimen, which elimination is accomplished in accordance with the present invention.

It has been determined that even harmonics of the induced alternating flux in the test specimen indicate and are indicative of the magnetism present in the element or rod 40 undergoing test. In accordance with the present invention, use is made of that indication to set up a counterbalancing and neutralizing magnetic field at the point at which the specimen is being tested, that is, at the testing head 10, and more specifically at the testing coil unit 23. As illustrated in Figure 2 of the drawings, a filter, generally indicated at 61, is connected by leads 59, one of which may be grounded, to the leads 49 of the secondary coil 22. An even harmonic filter, preferably 120 cycle, is selected which excludes all frequencies derived from secondary coil 22 with the exception of the second harmonic of the fundamental 60-cycle frequency. If the fundamental frequency is changed the necessary change in the filter 61 is obvious. The energy which is derived through the filter 61 is of small magnitude and, accordingly, is passed to an alternating current amplifier, indicated generally by the reference character 62, in which it is greatly amplified. Actually the presence of the amplifier 62 is necessary only to increase the strength of the derived energy and can be eliminated if that energy is itself sufficient. From the amplifier 62 the 120-cycle current passes to a rectifier and phase interpreter, indicated generally by the reference character 63, in which it is compared with a known wave of the same frequency in order to determine the phase of its voltage, this phase reversing through 180 degrees as the polarity of unidirectional magnetization in the specimen 40 reverses. During the comparison of the two voltages, of the known current and the unknown 120-cycle current, the latter is rectified and leaves the unit 63 as a pulsating direct current to be filtered in the filter, indicated generally by the reference character 64, and passed to the direct current power rectifier, indicated generally by the reference character 65, the output of which it controls both as to polarity and amplitude. The output of unit 65 is conveyed through conductors 67, 68, and 69 to the demagnetizing coils 36 and 37 of demagnetizing units 35. In the demagnetizing operation current at all times flows through the lead 67 common to the coils 36 and 37 but flows through only one of the remaining two leads 68 and 69 depending upon the polarity of the residual magnetism in the element 40, the respective coils being so wound as to oppose residual fields of opposite polarities.

Referring now to Figure 3, the electrical circuit of the demagnetizer comprising the present invention is shown with greater particularity. The leads 59 connected to the leads 49 of the secondary coil 22 of testing coil unit 23 are seen to connect directly to the 120-cycle filter 61 which is grounded upon one side. The ungrounded side is connected through lead 68 to the grid of a pentode tube 71, the plate voltage and biasing voltage for which is obtained from an alternating current source of supply 73. The source of supply 73 is connected to the primary winding of a transformer 74, the secondary of which includes a low voltage winding 75 connected to the cathode heater of the tube 71. The main secondary winding 78 of transformer 74 supplies energy to the plate of a full wave rectifying tube 79, the cathode of which is heated by being connected across a second low voltage winding 76 of transformer 74. The output of rectifier tube 79, comprising a pulsating direct current at 120 cycles, is connected through an iron core reactor 81 to the plate circuit of tube 71 and to the plate circuits of certain of the other tubes as will be described. The circuit of tube 79 includes a mid-tap 83 of the secondary winding 78 of transformer 74, and condensers 84 and 85 are connected across the output upon opposite sides of reactor 81 to constitute a filter providing a smooth high voltage for the plate circuit, the plate voltage connection to the tubes being completed through the ground at 86.

The A. C. amplifier and phase inverter 62 also includes the tube or tubes 84 comprising actually and in effect two separate tubes 84*a* and 84*b*. As in the case of tube 71 the cathode heaters of tubes 84*a* and 84*b* are supplied by low voltage winding 75 of transformer 74. The grid of tube 84a connects to the output of amplifier tube 71 through a condenser 86 while the grid of tube 84b connects to the output of tube 84a through a voltage divider 87 and condenser 88 in accordance with well-known practice. Consequently the voltage on the plate of tube 84a is 180 degrees out of phase with the voltage on the plate of tube 84b.

The rectifier and phase interpreter, indicated generally by the reference character 63, includes tubes 91 and 92 each of which is supplied with a pulsating 120-cycle direct current on its plate by the full wave rectifying tube 79 through the conductor 94. The cathode heaters are again supplied from the low voltage secondary winding 75 of transformer 74 and the grids of the tubes 91 and 92 are respectively connected to the output of tubes 84a and 84b so that they receive therefrom voltages 180 degrees out of phase. Accordingly, the plate currents in tubes 91 and 92 will vary, and as the pulsating direct current on the plates of the two tubes is of the same phase it follows that the plate current of one of the two tubes 91 and 92 will be greater than the other by an amount during normal operation which will be varied with variations in the grid voltage as effected by signals derived from the low energy harmonic.

If the output of tubes 91 and 92 were sufficiently powerful it could be used to energize the demagnetizing unit 35 but such is not the case and in order to amplify that power and to make certain that it is sufficient to accomplish the desired result the D. C. power rectifier, indicated generally by the reference character 65, is also provided. Rectifier 65 is seen to comprise two power output tubes 96 and 97 which may preferably be of the mercury vapor electric discharge type, commercially known under the trade name "Thyratron." The outputs of tubes 91 and 92 are impressed upon the grids of power output tubes 96 and 97, respectively, the pulsating direct current in each instance first being smoothed by the presence of a filter comprising a condenser 101, a choke 102 and a condenser 103. The grids of power tubes 96 and 97 are connected to a phase shifter, indicated generally by the reference character 106, the purpose of which is to shift the voltage of the grids through 90 degrees with respect to the plate voltage for the purpose of controlling the tube output. The plate current of power tubes 96 and 97 is provided by a power transformer 108 the primary of which is connected directly to the power source 73. Because of the shift in voltage in the grids the rectifier power tubes 96 and 97 fire through only a part of the positive half cycle of the plate current and the extent of the firing, in the sense of the part of the cycle through which the firing takes place, varies with the variation in the direct current voltage superimposed upon the grids by tubes 91 and 92, and that output in turn is varied with the signal which has come in from the secondary winding 22 of the test coil unit 23.

In a typical case the normal bias on the grids of power tubes 96 and 97 would be about minus 8 volts, a figure which would, of course, be varied with the plate voltage as supplied by the transformer unit 108. The potential above ground at 107 may be a negative 20 volts which is also the voltage at directly connected point 110 comprising an adjustable mid-point on the resistance 109 positioned between the tubes 91 and 92. The voltage at point 111 at tube 91 would, in the example assumed, be a negative 8 volts, approximately corresponding to the voltage at the cathode of tube 91, and also at the grid of power tube 96. The grid voltages of tubes 96 and 97 can be varied as desired and as necessary by adjusting the bias resistor 113 connected in the output circuit of rectifier tube 79.

In conditioning the power rectifier for operation the bias of resistor 113 is lowered bringing the voltage of point 107 nearer to ground and therefore raising it from its normal minus 20 volts approximately to a higher figure and so increasing the potential at the grids of tubes 96 and 97 connected thereto. The voltage of the grids of both tubes go up together and the increase is continued until the tubes fire. At this point 110 is adjusted on balance resistance 109 until the amount of rectification of the power tubes 96 and 97, as determined by the readings of ammeters 116 and 117 provided in the conductors 68 and 69 of the power tubes, is the same. If then the bias at resistor 113 is adjusted so as to again lower the voltage at point 107, thereby lowering the grid voltages of tubes 96 and 97 until they just fail to fire, the power tubes will be in condition for operation.

In the operation of the demagnetizing unit comprising the present invention the testing head 10 is positioned operatively with respect to the element to be tested, such as an oil well rod 40, which may pass therethrough as it is being drawn from the well in the manner indicated in Figure 1. It is to be understood, however, that the testing is not limited to the time of withdrawal or insertion of the rods in the well. In accordance with the testing methods in use the primary coils 21 of the test coil unit 23 are excited and a current is induced in the winding of secondary coil 22 of that unit which is determined by the properties and condition of the material of that portion of the rod 40 within the test coil unit. This current from secondary coil 22 is conducted to the testing unit 50 which has previously been conditioned for operation and which functions in accordance with the disclosure of co-pending application Serial No. 121,672.

Superimposed upon the current of secondary coil 22 are harmonics indicative of the presence of residual magnetism in the element being tested which, if uncompensated, will affect the indication given at the testing unit and so the accuracy thereof. The even second harmonic is probably the harmonic of greatest amplitude and is carried from the secondary winding 22 through the leads 59 to the filter 61 which permits it to pass to the amplifier and phase inverter 62 from which it is delivered to the rectifier and phase interpreter 63 as two individual currents shifted 180 degrees in phase. In the rectifier and phase interpreter 63 the two currents received from the unit 62 are directed respectively to tubes 91 and 92 in which they are compared with the same pulsating direct current at the same frequency as derived from the power supply rectifier tube 79. The direct current is delivered from the tubes 91 and 92 with a polarity determined by the signal received from the test specimen 40 which, in turn, is determined by its magnetic polarity, and the voltage of the pulsating direct current being proportional to the magnitude of the received signal which, in turn, is proportional to the magnetization. That direct current smoothed by the passage through the filter unit 64 is delivered to the power tubes 96 and 97 which are selectively energized, depending upon the strength and phase angle of the impressed direct current upon their grids, and deliver their output through the conductors 67, 68, and 69, connected directly to the demagnetizing coils 36 and 37 of the units 35 in the testing head 10. Normally only one of the tubes 96 or 97 will be energized and deliver demagnetizing current, but upon a reversal in the polarity of the magnetization in the test specimen the other of the output tubes 96 and 97 will be energized and the normally unenergized demagnetizing coils will be energized setting up a demagnetizing flux field opposite in polarity to that normally provided and in order to counteract the reverse polarity of the inherent magnetized field of the unit being tested.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an electrical testing apparatus to determine the properties and characteristics of the type in which a material is excited to induce a cyclic flux field affected by said properties and characteristics, in which said field is used to induce a current having characteristics affected by said field, and in which said current is used to indicate said characteristics and properties of said material; a demagnetizer to neutralize the magnetic field set up by the residual magnetism of said material including a demagnetizing unit having a flux-generating coil positioned at said material to generate a flux field counter to the field generated by the residual magnetism, a power unit to feed direct current to said demagnetizing unit, and a control determining the output of said power unit including an amplifier and phase inverter to feed current to a phase comparator and rectifier controlling said power unit, and a band pass filter in a circuit connecting said control to said testing apparatus and limiting the induced current received from said apparatus to an harmonic of the induced current.

2. In an electrical testing apparatus to determine the properties and characteristics of the type in which a material is excited to induce a cyclic flux field affected by said properties and characteristics, in which said field is used to induce a current having characteristics affected by said field, and in which said current is used to indicate said characteristics and properties of said material; a demagnetizer to neutralize the magnetic field set up by the residual magnetism of said material including a demagnetizing unit having oppositely wound flux-generating coils positioned at said material to generate a flux field counter to the field generated by the residual magnetism, a power unit to feed direct current selectively to the oppositely wound coils of said demagnetizing unit, and a control unit determining the output of said power unit to said oppositely wound coils and including an amplifier and phase inverter to feed current to a phase comparator and rectifier controlling said power unit, and a band pass filter in a circuit connecting said control to said testing apparatus and limiting the induced current received from said apparatus to an harmonic of the induced current.

3. A method of electrically testing rods and the like having remanent magnetization including the steps of exciting a limited length only of a rod to induce therein an alternating flux, inducing a current flow into an indicating circuit by the induced alternating flux in said limited length of said rod, impressing a direct current flux in said rod effective only in said limited length of the rod by which the current flow is induced into said indicating circuit and of a strength determined by a characteristic of the current flow induced in said indicating circuit, and displacing said rod to excite adjacent lengths thereof.

4. A method of electrically testing magnetized rods and the like including the steps of exciting a limited length only of said rod to induce therein an alternating flux, inducing a current flow in an indicating circuit by the alternating magnetic field set up in said limited length of said rod by said alternating flux and as modified by the presence of remanent magnetism in said length to indicate a characteristic of said length of said rod, impressing a local uni-directional magnetic field on said limited length of said rod effective substantially only at the point at which the current flow is induced into said indicating circuit, controlling the strength of said uni-directional magnetic field in accordance with variations in an harmonic of the current flowing in said indicating circuit, and displacing said rod to excite adjacent lengths thereof.

5. A method of electrically testing magnetized rods and the like including the steps of exciting a limited length only of a rod to induce therein an alternating flux, inducing a current flow in an indicating circuit by the alternating magnetic field set up in said limited length of said rod by said alternating flux and as modified by the presence of remanent magnetism in said length to indicate a characteristic of said length of said rod, impressing a reversible local uni-directional magnetic field on said length of said rod effective at the point at which the current flow is induced into said indicating circuit, controlling the direction and strength of said reversible uni-directional magnetic field in accordance with variations in an harmonic of the current flowing in said indicating circuit, and displacing said rod to excite adjacent lengths thereof.

6. A method of determining electrically the internal characteristic of a specimen having remanent magnetization including electrically exciting a small part only of said specimen to induce therein an alternating flux, inducing an alternating current in an indicating circuit by said alternating flux as modified by the presence of remanent magnetism in said small part only of said specimen to indicate a characteristic of said part, impressing a local uni-directional magnetic field on said small part of said specimen effective substantially to cancel the effects of said remanent magnetism in said small part at the point at which said alternating current is induced to provide a true indication of the characteristic of said part in said indicating circuit, displacing said specimen relative to the position at which the alternating flux is induced in said specimen, and controlling the strength of said uni-directional magnetic field in response to an harmonic of said alternating current.

7. A method of determining electrically the physical characteristics of a specimen having remanent magnetization including electrically exciting a small part only of said specimen to induce therein an alternating flux, inducing in an indicating circuit an alternating current by said alternating flux in said part of said specimen as modified by the remanent magnetism therein, impressing a local uni-directional magnetic field on said part of said specimen effective substantially to neutralize the strength of said remanent magnetism only in said part and at the point at which said alternating current flow is induced and in order to eliminate from the indication of said indicating circuit all effects of said remanent magnetism in said part, displacing said specimen relative to said point at which an alternating current is induced in said indicating circuit, filtering an harmonic from the current in said indicating circuit, and controlling the strength and direction of said uni-directional magnetic field in response to variations in said harmonic.

8. A method of determining electrically physical characteristics of a specimen having remanent magnetization varying in strength along its length including electrically exciting a part of the length of the specimen to induce in said part an alternating flux, inducing a current in an indicating circuit by said alternating flux as modified by the remanent magnetism, impressing a local magnetic field upon said part effective at the point at which said alternating current flow is induced in said indicating circuit for the purpose of eliminating the effect of remanent magnetism in said part of the length of said specimen, filtering all frequencies except an even harmonic from current derived from said indicating circuit, rectifying and amplifying the filtered energy derived from said circuit, controlling the strength of the magnetic field impressed upon said specimen by variations in said rectified and amplified energy, and displacing said specimen relative to the point of electrical excitation.

9. A method of electrically testing a specimen having residual magnetism including electrically exciting locally a part only of the specimen to induce therein an alternating flux, inducing a flow of current by said alternating flux as modified by the residual magnetism in said part, impressing a local uni-directional magnetic field on said part of said specimen to neutralize the effect of said residual magnetism in said part in said current, displacing said specimen relative to the point at which the current flow is induced, and controlling the strength of said uni-directional magnetic field by changes in said current effected by variations in the residual magnetism of said specimen along its length.

10. In an electrical testing apparatus to determine the properties and characteristics of materials having residual magnetism, an alternating field-creating unit to impress upon a portion of the material being tested an alternating flux, a pick-up unit to receive a current induced by the flux field of said portion of said material as impressed by said field-creating unit and modified by the residual magnetic field of said portion of said material, a testing unit to receive current from said pick-up unit and to indicate the characteristics thereof, a demagnetizing unit to neutralize the magnetic field in said material set up by the residual magnetism of said material at the point at which said current is induced in said pick-up unit by generating a local flux field in said material counter to the field generated by said residual magnetism at said point, a source of direct current to said demagnetizing unit, and a control for said demagnetizing unit connected to said pick-up unit to vary the strength of the flux field created thereby in accordance with variations in the current impressed in said pick-up unit as produced by variations in the residual magnetism of the material being tested.

11. A method of determining electrically the properties of a sample of ferromagnetic material capable of retaining a substantial degree of permanent magnetization comprising using the sample as the core of an electrical transformer having input windings cumulatively coupled to an output winding, supplying an alternating current to said input winding, superimposing a uni-directional flux on said material effectively to annul the effect of permanent magnetization therein at said output winding, and selecting an even harmonic from the voltage induced in said output winding and controlling the direction and magnitude of said uni-directional flux by variations in said even harmonic.

12. In an apparatus for electrically testing ferromagnetic materials having residual magnetism, coils arranged to encircle the material to be tested, said coils comprising an input winding connected to a source of alternating current and an output coil magnetically coupled to said input coil by said material as a core, a demagnetizing coil encircling said material and connected to a source of direct current, a control connected to said output to vary the strength and direction of the direct current in said demagnetizing coil including a filter to select an harmonic of the voltage therein the characteristics of which vary with the strength and direction of the residual magnetism of said material, and a testing unit connected to said output coil to indicate the characteristics of said material other than said residual magnetism and as reflected by an harmonic of the voltage in said output winding other than the harmonic effective in said control for said demagnetizing coil current.

13. In an electrical testing apparatus to determine the properties and characteristics of a material having remanent magnetism of the type in which a material is excited to induce therein a cyclic flux field affected by said properties and characteristics, in which said field is used to induce a current flow in a circuit, the odd harmonics of the current so induced indicating properties and characteristics of the material and the even harmonics indicating the strength and direction of the remanent magnetism in said material; a demagnetizer to eliminate substantially the even harmonics from said current in said circuit by neutralizing the magnetic field set up by the remanent magnetism at the point at which current flow is induced in said circuit, said demagnetizer including a demagnetizing unit positioned at said material to generate a local flux field counter to the field generated by said remanent magnetism at said point only, a power unit to supply direct current to said demagnetizing unit, and a control connected to said circuit to receive an even harmonic of the current flowing therein, said control determining the strength and direction of the direct current in said demagnetizing unit in a predetermined relationship to said even harmonic.

14. A method of electrically testing elongated rods or the like to determine the properties and characteristics present at each point along their length, said rods varying in said properties and characteristics along their length and having remanent magnetism which also varies in strength and direction along their length, including electrically exciting the rods individually to induce therein an alternating flux, inducing a flow of current in an indicating circuit by the field of a rod at a particular point in its length, said field at said point being made up of the alternating flux impressed thereon as modified by the properties and characteristics of said rod at that point and by the remanent magnetism there present, and substantially eliminating from the current flow in said indicating circuit all effects of the presence of remanent magnetism in said rod at said point by setting up a local uni-directional flux field in said rod at said point to neutralize the field created by said remanent magnetism at said point only, moving said rod to enable an adjacent point to induce said flow of current in said indicating circuit, and varying the strength and direction of said local uni-directional flux field to neutralize the field created by remanent magnetism at said adjacent point in accordance with variations of an even harmonic of the current in said indicating circuit upon the movement of said rod.

15. A method of testing electrically elongated rods or the like having remanent magnetism to determine the properties and characteristics present at each point along their length by indicating variations in a current induced by a flux field in said rod and resulting from variations in the odd harmonics of said current only, including creating an alternating flux field at one point in the length of said rod, moving a rod longitudinally through said flux to bring adjacent points successively therein, inducing a flow of current in an indicating circuit by the field in said rod at a particular point and as made up of the field created by said alternating flux and by the remanent magnetism in said rod effective at said point, and substantially eliminating from the current flow in said indicating circuit the even harmonics resulting from the presence of said remanent magnetism in said rod at said point by setting up a uni-directional flux at said rod adjacent said point to neutralize the field created by said remanent magnetism at said point, moving said rod to enable an adjacent point to induce said flow of current in said indicating circuit, and varying the strength and direction of said local uni-directional flux field to neutralize the field created by remanent magnetism at said adjacent point in accordance with variations of an even harmonic of the current in said indicating circuit upon the movement of said rod.

16. A method of determining electrically the properties of an elongated element of ferromagnetic material capable of retaining a substantial degree of permanent magnetization, including moving said element longitudinally through an alternating flux to impress an alternating field thereon modified by the properties and characteristics of said element and by the strength and direction of remanent magnetism therein, inducing a current flow in an indicating circuit by the field of said element at a particular point in order that said current as made up of its odd harmonics may accurately reflect the properties and characteristics of said element at said point, and substantially eliminating the even harmonics of the current in said indicating circuit and their effect upon the indications given by said circuit by setting up a local uni-directional flux at said element adjacent said point to neutralize the field created by said remanent magnetism at said point, moving said rod to enable an adjacent point to induce said flow of current in said indicating circuit, and varying the strength and direction of said local uni-directional flux field to neutralize the field created by remanent magnetism at said adjacent point in accordance with variations of an even harmonic of the current in said indicating circuit upon the movement of said rod.

References Cited in the file of this patent

UNITED STATES PATENTS

| Number | Name | Date |
|---|---|---|
| 1,360,326 | Slepian | Nov. 3, 1920 |
| 1,743,087 | Kinsley | Jan. 7, 1930 |
| 1,954,996 | Hehn | Apr. 17, 1934 |
| 2,406,870 | Vacquier | Sept. 3, 1946 |
| 2,410,039 | Beach | Oct. 29, 1946 |
| 2,418,553 | Irwin | Apr. 8, 1947 |
| 2,421,583 | Stuart | June 3, 1947 |